US011938931B2

(12) United States Patent
Noguchi et al.

(10) Patent No.: US 11,938,931 B2
(45) Date of Patent: Mar. 26, 2024

(54) STOP ASSIST SYSTEM

(71) Applicant: HONDA MOTOR CO., LTD., Tokyo (JP)

(72) Inventors: Junpei Noguchi, Tokyo (JP); Gaku Shimamoto, Tokyo (JP); Takuma Sekino, Tokyo (JP); Tatsuro Fujiwara, Tokyo (JP); Akiko Nakamura, Tokyo (JP); Kazuya Kobayashi, Tokyo (JP); Masafumi Sagara, Tokyo (JP); Takeshi Sasajima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 17/675,152

(22) Filed: Feb. 18, 2022

(65) Prior Publication Data
US 2022/0306090 A1  Sep. 29, 2022

(30) Foreign Application Priority Data

Mar. 26, 2021  (JP) .................. 2021-053115

(51) Int. Cl.
*B60W 30/09* (2012.01)
*B60W 50/14* (2020.01)
*B60W 30/06* (2006.01)

(52) U.S. Cl.
CPC ............ *B60W 30/09* (2013.01); *B60W 50/14* (2013.01); *B60W 30/06* (2013.01); *B60W 2540/215* (2020.02); *B60W 2554/801* (2020.02)

(58) Field of Classification Search
CPC ...... B60W 30/09; B60W 50/14; B60W 30/06; B60W 2540/215; B60W 2554/801; B60W 30/181; B60W 2050/146
See application file for complete search history.

(56) References Cited

U.S. PATENT DOCUMENTS

| 2018/0111610 A1* | 4/2018 | Romainczyk ....... B60W 30/143 |
| 2018/0354502 A1* | 12/2018 | Yaldo ................. B62D 15/0285 |
| 2019/0114917 A1* | 4/2019 | Kapinos ................. G08G 1/165 |

FOREIGN PATENT DOCUMENTS

| CN | 103079935 A | * | 5/2013 | ............. B60K 35/00 |
| CN | 107207006 A | * | 9/2017 | ............ B60W 30/06 |
| WO | 2011132309 A1 | | 10/2011 | |

* cited by examiner

*Primary Examiner* — Hung Q Nguyen
(74) *Attorney, Agent, or Firm* — Armstrong Teasdale LLP

(57) ABSTRACT

A stop assist system for moving a moving body to a stop position and making the moving body stop at the stop position includes: an external environment recognizing unit that recognizes an external environment of the moving body; and a moving body control unit that executes a driving process to make the moving body travel to the stop position based on a recognition result of the external environment recognizing unit. The moving body control unit suspends the driving process when, while the moving body is traveling to the stop position, the moving body control unit determines, based on the recognition result, that there is an object within a range of a prescribed lateral threshold value on a lateral outside of the moving body and the object extends over a prescribed longitudinal threshold value or more along a travel direction within the range.

7 Claims, 11 Drawing Sheets

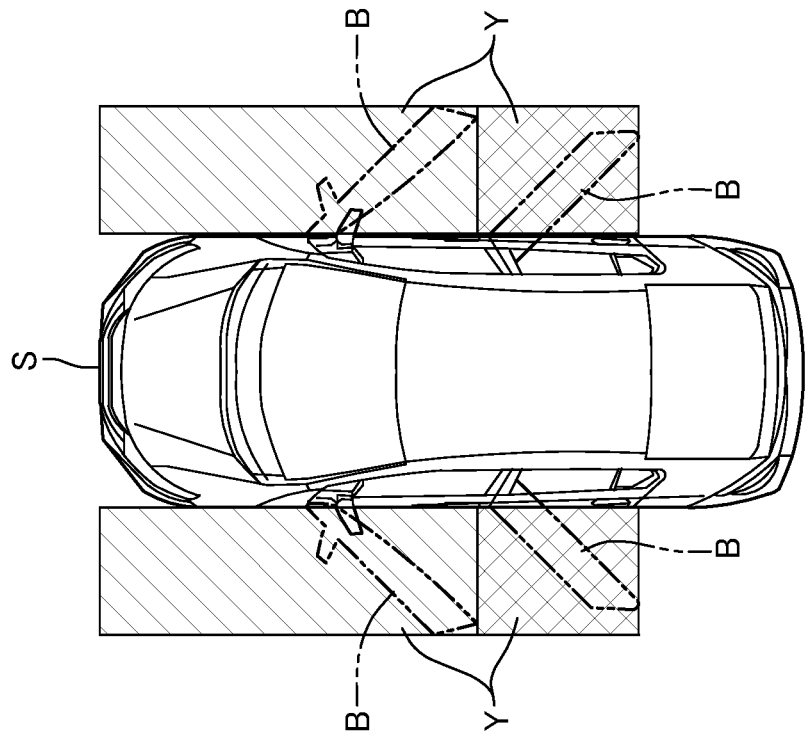
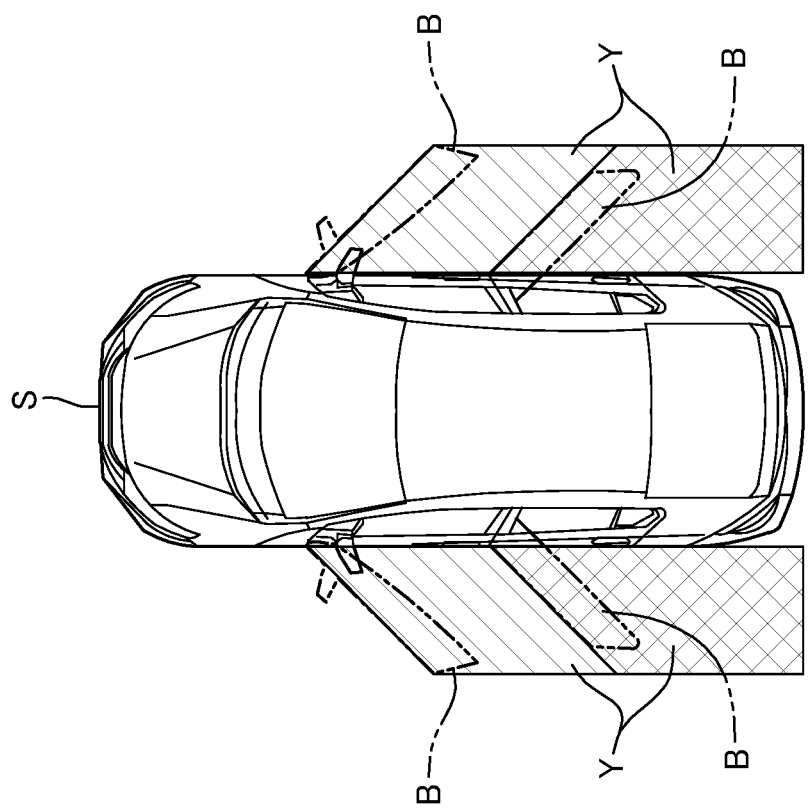

STOP ASSIST SYSTEM

TECHNICAL FIELD

The present invention relates to a stop assist system for moving and stopping a moving body such as a vehicle.

BACKGROUND ART

There is known a parking assist device (parking assist system) for moving a vehicle to a parking space and parking the vehicle in the parking space by travel control without requiring operation by the driver onboard the vehicle or by remote operation from outside the vehicle (for example, WO2011/132309A1).

The parking assist device described in WO2011/132309A1 is provided with a stop position decision unit that decides a stop position for making the vehicle stop temporarily near the entrance of the parking space. The stop position decision unit decides the stop position as a position where at least a part of the vehicle has entered the parking space and the occupants can exit the vehicle through the doors provided on the side of some of the seats, such as the driver's seat, of the own vehicle. After making the vehicle stop at the stop position, when exit of the occupants with the luggage is detected, the parking assist device parks the vehicle in the parking space by remote operation or travel control.

There may be a case where, after the parking, it becomes necessary to get in and out of the passenger compartment of the vehicle (moving body) to open the hood and perform maintenance, for example. However, if the vehicle is stopped in a position where it is difficult to open and close the doors (opening and closing members) of the passenger compartment, it becomes difficult to get in and out of the passenger compartment of the vehicle (or to enter and exit the moving body).

SUMMARY OF THE INVENTION

In view of the foregoing background, a primary object of the present invention is to provide a stop assist system for moving a moving body to a stop position and to stop the moving body at the stop position such that the stop assist system can prevent the moving body from traveling to a position where it may become difficult to enter and exit the moving body unexpectedly by the user.

To achieve the above object, one aspect of the present invention provides a stop assist system (1, 201, 301) for moving a moving body (S) to a stop position and making the moving body stop at the stop position, comprising: an external environment recognizing unit (41) that recognizes an external environment of the moving body; and a moving body control unit (43) that executes a driving process to make the moving body travel to the stop position based on a recognition result of the external environment recognizing unit, wherein the moving body control unit suspends the driving process when, while the moving body is traveling to the stop position, the moving body control unit determines, based on the recognition result, that there is an object within a range of a prescribed lateral threshold value (W) on a lateral outside of the moving body and the object extends over a prescribed longitudinal threshold value (D) or more along a travel direction within the range.

When there is an object within the range less than or equal to the lateral threshold value from a side surface of the moving body such that the object extends over the longitudinal threshold value or more in the travel direction, it can be predicted that there is a wall-like object extending along the travel direction at a position where the gap between the object and the opposing lateral side of the moving body is less than or equal to the lateral threshold value. In this case, it is expected that if the moving body continues moving, it will become difficult to enter and exit the moving body due to the small gap between the moving body and the object.

According to the above aspect, in the case where there is an object within the range less than or equal to the lateral threshold value such that the object extends over the longitudinal threshold value or more in the travel direction, the driving process is suspended. Therefore, the user can recognize that it may be difficult to enter and exit the moving body. Thus, it is possible to prevent the moving body from being moved to and stopped in a space where it may become difficult to enter and exit the moving body unexpectedly by the user.

In the above aspect, preferably, the stop assist system further comprises an input/output unit (38) capable of making a notification to a user of the moving body according to a signal from the moving body control unit and capable of receiving input from the user, wherein after suspending the driving process, the moving body control unit makes the input/output unit make a notification to the user inquiring whether to resume the driving process, and resumes the driving process when the input/output unit receives input from the user indicating that the user wants to resume the driving process.

According to this aspect, when there is input from the user indicating that the resumption of the driving process is desired, the moving body control unit resumes the driving process. Therefore, when the driving process is suspended, the user can resume the driving process, whereby convenience of the stop assist system is improved.

To achieve the above object, another aspect of the present invention provides a stop assist system (101) for moving a moving body (S) to a stop position and making the moving body stop at the stop position, comprising: an external environment recognizing unit (41) that recognizes an external environment of the moving body; a moving body control unit (43) that executes a driving process to make the moving body travel to the stop position based on a recognition result of the external environment recognizing unit; and an input/output unit (38) capable of making a notification to a user of the moving body according to a signal from the moving body control unit and capable of receiving input from the user, wherein while the moving body is traveling to the stop position, when the moving body control unit determines, based on the recognition result, that there is an object within a range of a prescribed lateral threshold value (W) on a lateral outside of the moving body and the object extends over a prescribed longitudinal threshold value (D) or more along a travel direction within the range, the moving body control unit makes the input/output unit make a notification notifying presence of the object.

When there is an object within the range less than or equal to the lateral threshold value from a side surface of the moving body such that the object extend over the longitudinal threshold value or more in the travel direction, it can be predicted that there is a wall-like object extending along the travel direction at a position where the gap between the object and the opposing lateral side of the moving body is less than or equal to the lateral threshold value. In this case, it is expected that if the moving body continues moving, it will become difficult to enter and exit the moving body due to the small gap between the moving body and the object.

According to the above aspect, in the case where there is an object within the range less than or equal to the lateral threshold value such that the object extends over the longitudinal threshold value or more in the travel direction, the input/output unit makes a notification. Therefore, the user can recognize that it may be difficult to enter and exit the moving body. Thus, it is possible to prevent the moving body from being moved to and stopped in a space where it may become difficult to enter and exit the moving body unexpectedly by the user.

In the above aspect, preferably, after the input/output unit made the notification to the user, if the input/output unit receives input from the user instructing cancellation of the driving process, the moving body control unit cancels the driving process.

According to this aspect, when the input/output unit receives input instructing cancellation of the driving process, the moving body control unit cancels the driving process. Thereby, the user can easily cancel the movement of the moving body under the driving process by making input to the input/output unit.

In the above aspect, preferably, the moving body has an opening and closing member (B, B1, B2) for entering and exiting the moving body, and the moving body control unit sets the prescribed lateral threshold value according to a movement mode of the opening and closing member.

According to this aspect, the lateral threshold value can be set to an appropriate threshold value according to the movement mode of the opening and closing member.

In the above aspect, preferably, the moving body control unit suspends the driving process when the moving body control unit determines that there will be an object within a required region (Y) that will be required for entering and exiting the moving body when the moving body is in the stop position.

According to this aspect, it is possible to avoid a situation where the user cannot enter or exit the passenger compartment after the moving body has reached the stop position.

In the above aspect, preferably, wherein the moving body control unit continues the driving process when, while the moving body is traveling, the moving body control unit determines based on the recognition result that no object extending over the prescribed longitudinal threshold value or more in the travel direction is present within the range of the prescribed lateral threshold value on the lateral outside of the moving body.

According to this aspect, when the moving body is moved to a space where there is little possibility that it will become difficult to get in or out of the passenger compartment, it is possible to maintain the driving process without stopping it.

According to the foregoing configuration, it is possible to provide a stop assist system for moving a moving body provided with a passenger compartment to a stop position and making the moving body stop at the stop position which can prevent the moving body from being moved to and stopped at a position where it may become difficult to get into or out of the passenger compartment unexpectedly by the user.

BRIEF DESCRIPTION OF THE DRAWINGS

FIG. 10A is a diagram showing required regions for forward parking;

FIG. 10B is a diagram showing required regions for backward parking; and

DETAILED DESCRIPTION OF THE INVENTION

In the following, an embodiment of the present invention will be described in detail with reference to the drawings.

First Embodiment

Figure 1:
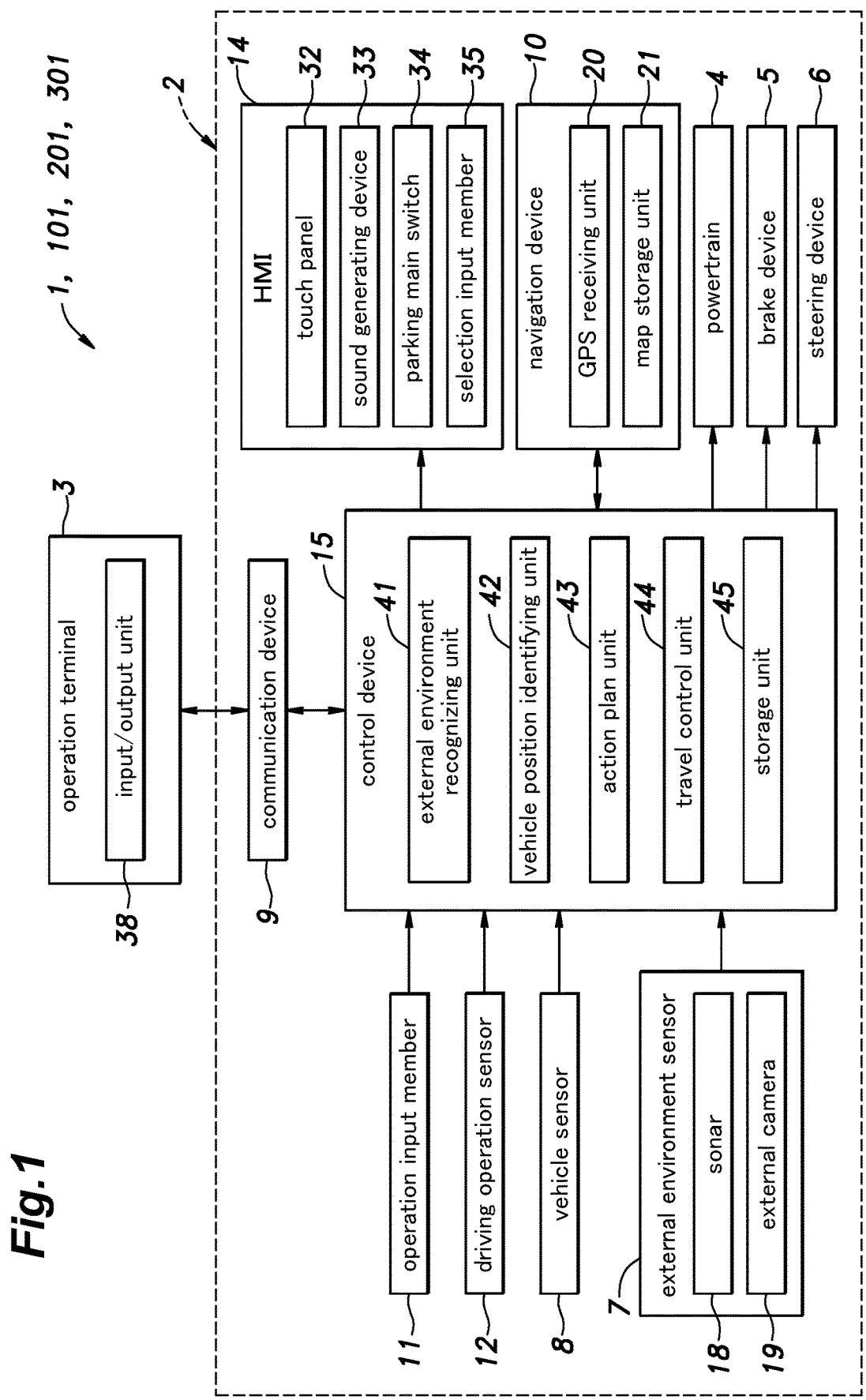
FIG. 1 is a functional block diagram of a vehicle provided with a parking assist system according to the first embodiment of the present invention.

As shown in FIG. 1, a parking assist system 1 is a system for parking a vehicle S by remote operation. In the present embodiment, the vehicle S is a four-wheel automobile that can travel autonomously.

The vehicle S provided with the parking assist system 1 has doors B (opening and closing members) for getting in and out of the cabin (passenger compartment). Note that the movement mode of each door B is not particularly limited so long as it can be opened and closed when a user enters or exits the vehicle S. For example, the door B may be a hinged door B1 that is connected to the vehicle body via a hinge and sings about a hinge axis. Also, the door B may be a slide door B2 configured to slide for opening and closing. In the following, description will be made of examples in which the vehicle S, to which the parking assist system 1 is applied, is provided with hinged doors B1 configured to swing about respective hinge axes extending in the vertical direction of the vehicle body or the vehicle S is provided with slide doors B2 configured to slide in the fore and aft direction of the vehicle body.

The parking assist system 1 includes a vehicle system 2 installed in the vehicle S and at least one operation terminal 3. The vehicle system 2 includes a powertrain 4, a brake device 5, a steering device 6, an external environment sensor 7, a vehicle sensor 8, a communication device 9, a navigation device 10, an operation input member 11, a human machine interface (HMI) 14, and a control device 15. The above components of the vehicle system 2 are connected to each other so that signals can be transmitted therebetween via communication means such as a Controller Area Network (CAN).

The powertrain 4 is a device configured to apply a driving force to the vehicle S. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission and a shift actuator for changing a shift position of the automatic transmission (a shift position of the vehicle). The brake device 5 is a device configured to apply a brake force to the vehicle S. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle S to detect an object outside the vehicle S and to acquire surrounding information of the vehicle S. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle S and captures the ultrasonic waves reflected by an object around the vehicle thereby to detect a position (distance and direction) of the object. Multiple sonars 18 are provided at each of a rear part and a front part of the vehicle S. In the present embodiment, one pair of left and right sonars 18 is provided on a rear bumper, one pair of left and right sonars 18 is provided on a front bumper, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with eight sonars 18 in total. The sonars 18 provided on the rear bumper mainly detect positions of objects behind the vehicle S. The sonars 18 provided on the front bumper mainly detect positions of objects in front of the vehicle S. The sonars 18 provided at the left and right side faces of the front end portion of the vehicle S detect positions of objects on left and right outsides of the front end portion of the vehicle S, respectively. The sonars 18 provided at the left and right side faces of the rear end portion of the vehicle S detect positions of objects on left and right outsides of the rear end portion of the vehicle S, respectively.

The external cameras 19 are devices configured to capture images around the vehicle S. Each external camera 19 consists of a digital camera using a solid imaging element such as a CCD or a CMOS, for example. The external cameras 19 include a front camera for capturing an image in front of the vehicle S and a rear camera for capturing an image to the rear of the vehicle S. The external cameras 19 may include a pair of left and right side cameras that are provided in the vicinity of the door mirrors of the vehicle S to capture images on left and right sides of the vehicle S.

The vehicle sensor 8 includes a vehicle speed sensor configured to detect the speed of the vehicle S, an acceleration sensor configured to detect the acceleration of the vehicle S, a yaw rate sensor configured to detect the angular velocity around a vertical axis of the vehicle S, and a direction sensor configured to detect the direction of the vehicle S. The vehicle speed sensor may be constituted of multiple wheel speed sensors configured to detect respective wheel speeds (rotation speeds of the respective wheels), for example. The yaw rate sensor consists of a gyro sensor, for example.

The communication device 9 is a device that mediates wireless communication between the control device 15 and the operation terminal 3. The control device 15 communicates with the operation terminal 3 carried by the user via the communication device 9 over Bluetooth (registered trademark) which is s near field wireless communication standard.

The navigation device 10 is a device configured to obtain a current position of the vehicle S and provides route guidance to a destination and the like. The navigation device 10 includes a GPS receiving unit 20 and a map storage unit 21. The GPS receiving unit 20 identifies a position (latitude and longitude) of the vehicle S based on a signal received from an artificial satellite (positioning satellite). The map storage unit 21 consists of a known storage device such as a flash memory or a hard disk, and stores map information.

The operation input member 11 is provided in an interior of the vehicle S to receive an input operation performed by the occupant (user) to control the vehicle S. The operation input member 11 includes a steering wheel, an accelerator pedal, a brake pedal (brake input member), and a shift lever (a shift member). The shift lever is configured to receive an operation for selecting the shift position of the vehicle.

The driving operation sensor 12 detects an operation amount of the operation input member 11. The driving operation sensor 12 includes a steering angle sensor configured to detect a steering angle of the steering wheel, a brake sensor configured to detect a pressing amount of the brake pedal, and an accelerator sensor configured to detect a pressing amount of the accelerator pedal. The driving operation sensor 12 outputs a detected operation amount to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

The operation terminal 3 is a wireless terminal that can be carried by the user, and in the present embodiment, the operation terminal 3 is constituted of a smartphone. The operation terminal 3 has a prescribed application preinstalled therein so that the operation terminal 3 can communicate with the control device 15 from outside the vehicle via the communication device 9.

The operation terminal 3 is equipped with an input/output unit 38. The input/output unit 38 is constituted of a touch panel having a screen. When the operation terminal 3 receives a signal from the control device 15, the operation terminal 3 processes the signal and the input/output unit 38 displays the process result on the screen as appropriate to notify the user. Also, the input/output unit 38 receives input from the user by detecting a touch (contact or pressing) of the user on the screen.

The parking assist system 1 is a system for performing so-called automatic parking to autonomously moving the vehicle S to a target position (a target parking position or a target unparking position) selected by the occupant thereby to park or unpark the vehicle S.

The parking assist system 1 includes the external environment sensor 7, the control device 15, and the operation terminal 3.

The control device 15 executes a so-called remote parking to park the vehicle S by controlling the vehicle S to move the vehicle S to the target position according to an operation input to the operation terminal 3. To perform such control of the vehicle S, the control device 15 includes an external environment recognizing unit 41, a vehicle position identifying unit 42, an action plan unit 43, a travel control unit 44, and a storage unit 45.

The external environment recognizing unit 41 recognizes an obstacle (for example, a parked vehicle or a wall) that is present around the vehicle S based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle S having the control device 15 installed therein based on the signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle S in which the vehicle position identifying unit 42 is installed by the so-called inertial navigation.

The travel control unit 44 controls the powertrain 4, the brake device 5, and the steering device 6 based on a travel control instruction from the action plan unit 43 to make the vehicle S travel.

Parking Assist Process

Figure 2:
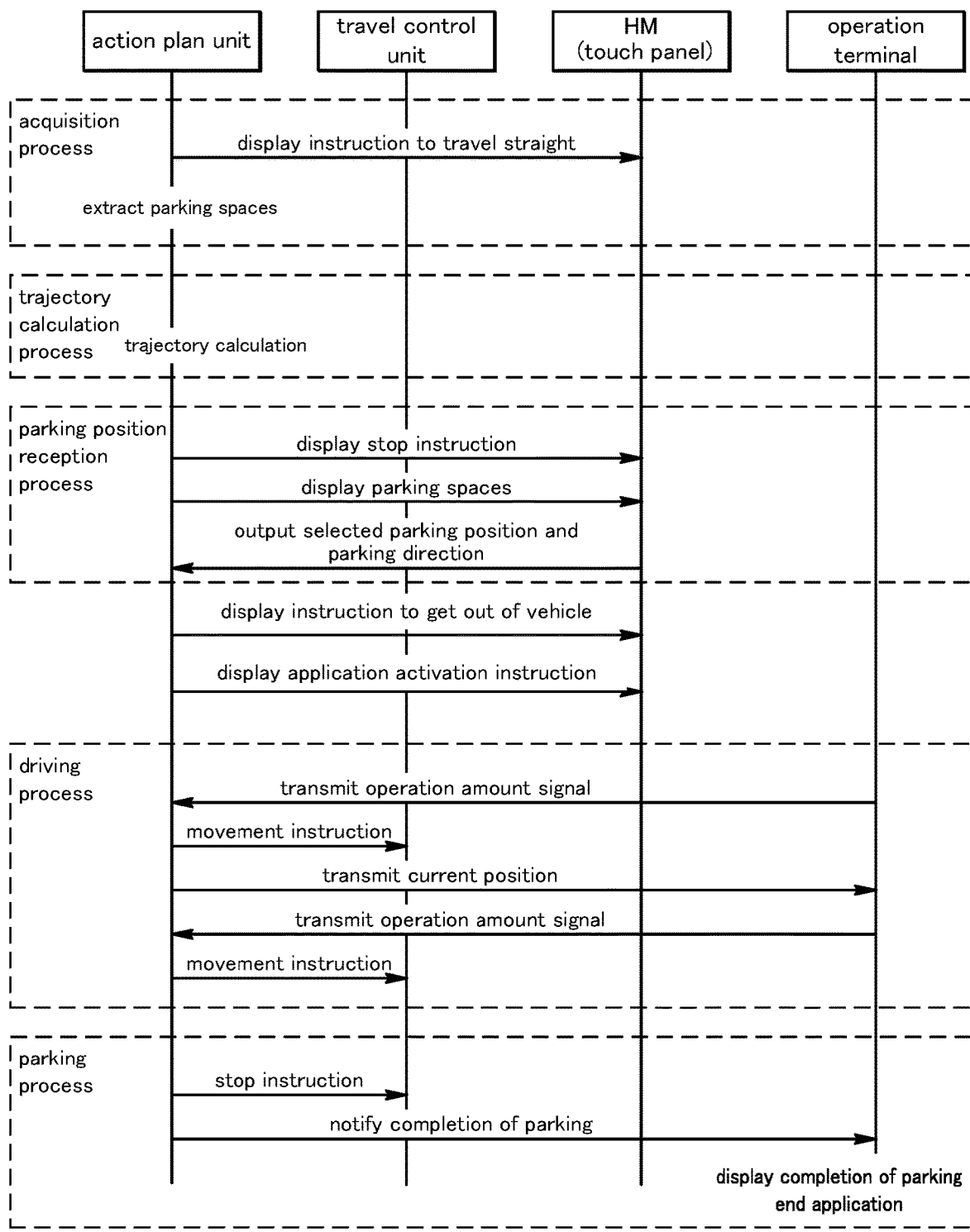
FIG. 2 is a time chart of an automatic parking process performed by the parking assist system.

After the vehicle S is stopped, when the action plan unit 43 detects an input from the user to the touch panel 32 indicating that the user wants the parking assist under remote operation to be performed, the action plan unit 43 performs a parking assist process. In the following, the parking assist process will be described with reference to the time chart of FIG. 2.

The action plan unit 43 first executes an acquisition process to acquire one or more parking spaces. More specifically, the action plan unit 43 first displays a notification that instructs the user (driver) to move the vehicle S straight on the touch panel 32 of the HMI 14. While the user is moving the vehicle S straight, the action plan unit 43 acquires, based on the signal from the external environment sensor 7, a position and size of each detected obstacle and positions of the white lines provided on the road surface. The action plan unit 43 extracts, based on the acquired position and size of the obstacle and the positions of the white lines, one or more spaces in which the vehicle can be parked (namely, parking spaces).

Next, the action plan unit 43 executes a trajectory calculation process to calculate a trajectory of the vehicle S from the current position of the vehicle S to each extracted parking space. Preferably, the action plan unit 43 calculates the trajectory for each of the forward parking and the backward parking so that an input operation from the user to select the forward parking or the backward parking can be received.

In the present embodiment, in the trajectory calculation process, the trajectory is set to make the vehicle S perform switching between forward movement and backward movement. The switching operation may be executed repeatedly.

In the case of backward parking, the action plan unit 43 sets switching points at which the movement mode of the vehicle S switches from the forward movement to the backward movement (hereinafter, front switching points) at positions where the whole vehicle S is positioned outside the parking position. Also, the action plan unit 43 sets one of the front switching points that will be passed the last (hereinafter, the last front switching point) at a position from which the vehicle S can reach the parking position only by backward movement without requiring a steering operation. Thereby, in the automatic parking, the vehicle S reaches the parking position from the last front switching point only by backward movement.

In the case of forward parking, the action plan unit 43 sets switching points where the movement mode of the vehicle S switches from backward movement to forward movement (hereinafter, rear switching points) at positions where the whole vehicle S is positioned outside the parking position. Also, the action plan unit 43 sets one of the rear switching points that will be passed the last (hereinafter, the last rear switching point) at a position from which the vehicle S can reach the parking position only by forward movement without requiring a steering operation. Thereby, in the automatic parking, the vehicle S reaches the parking position from the last rear switching point only by forward movement.

In the following, the last front switching point and the last rear switching point may be collectively referred to as the last switching point.

Next, the action plan unit 43 executes a parking position reception process to receive a parking position selected from the one or more parking spaces. Specifically, when the action plan unit 43 acquires at least one parking space, the action plan unit 43 makes the touch panel 32 display a notification instructing the user (driver) to stop the vehicle S. At this time, after instructing the user to stop the vehicle S, the action plan unit 43 may instruct the user to put the shift lever to the parking position.

The action plan unit 43 displays the current position of the vehicle S and the parking spaces on the touch panel 32. At this time, the action plan unit 43 preferably displays images acquired by the external camera 19 on the touch panel 32 in a superimposed manner. Thereafter, the action plan unit 43 makes the touch panel 32 display a notification prompting the user to select one of the parking spaces in which the vehicle S is to be parked (namely, to select the parking position). When the desired parking position is input by the user, the touch panel 32 outputs a signal corresponding to the input parking position to the action plan unit 43.

Next, the action plan unit 43 makes the touch panel 32 display a notification prompting the user to get out of the vehicle S and makes the input/output unit 38 (touch panel) of the operation terminal 3 display a notification instructing the user to activate an application for remote parking. Following these notifications, the user gets out of the vehicle S and then activates the application on the operation terminal 3.

Figure 3:
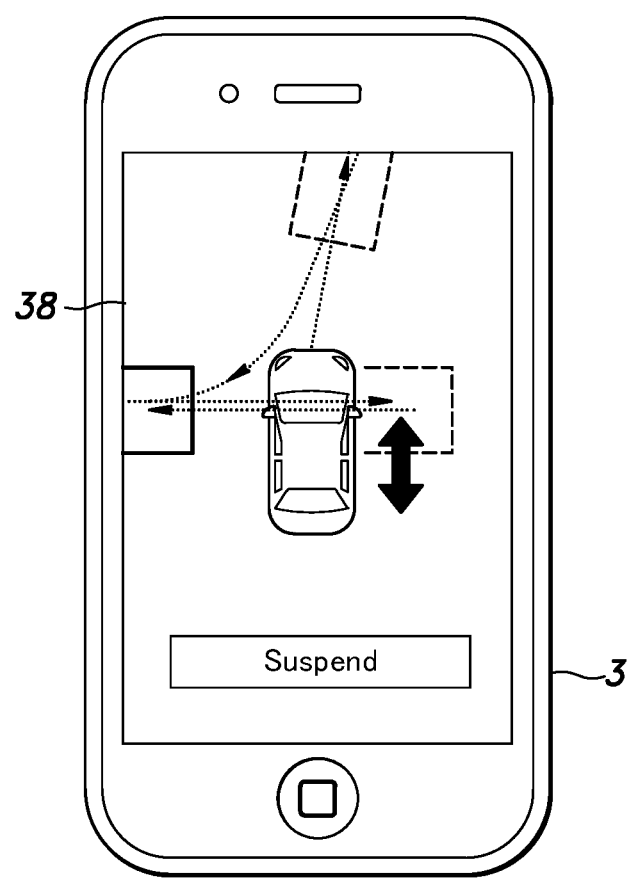
FIG. 3 is an example of a screen display of an input/output unit of an operation terminal during a driving process.

As shown in FIG. 3, when the application is activated, an operation input reception screen is displayed on the input/output unit 38 of the operation terminal 3. When the user performs operation input with the input/output unit 38 (touch panel) of the operation terminal 3, the operation terminal 3 transmits an operation amount to the action plan unit 43. Based on the recognition result of the external environment recognizing unit 41 and the received operation amount, the action plan unit 43 performs a driving process of moving the vehicle S along the trajectory to the parking position. Namely, the action plan unit 43 corresponds to moving body control unit which performs a driving process of moving the moving body (vehicle S) to the target position (parking position). In the present embodiment, the action plan unit 43 sets the movement amount of the vehicle S depending on an amount of swiping on the input/output unit 38 of the operation terminal 3. Thus, the parking assist system 1 for parking the vehicle S in the parking position is configured wherein based on the recognition by the external environment recognizing unit 41, the action plan unit 43 moves the vehicle S depending on the input amount to the operation terminal 3.

When the vehicle S arrives at the parking position, the action plan unit 43 executes a parking process. In the parking process, the action plan unit 43 first drives the shift actuator to set the shift position (shift range) to a parking position (parking or P range) and stops the powertrain 4. When the powertrain 4 is stopped, the action plan unit 43 transmits a parking completion signal to the operation terminal 3. When the parking completion signal is received by the input/output unit 38, the operation terminal 3 displays a notification that the parking has completed on the screen. Namely, the parking position corresponds to the position where the vehicle S is parked, namely, a stop position where the vehicle S is to be stopped.

Narrowness Determination Process

In the driving process of the automatic parking process, the action plan unit 43 executes a narrowness determination process repeatedly at a prescribed interval while the vehicle S is moving from the last switching point to the parking position. The narrowness determination process is a process for determining, based on the information acquired by the sonars 18 provided on the left and right side surfaces of the vehicle S, whether the vehicle S may be moved to the parking position. In the following, details of the narrowness determination process will be described with reference to FIGS. 4, 5A, 5B, 6, and 7A-7C. Note that it is assumed that before the narrowness determination process is started, a cancellation flag is set to zero.

Also note that though in the following description, the action plan unit 43 executes the narrowness determination process in the driving process only while the vehicle S is moving from the last switching point to the parking position, the present invention is not limited to this. In another embodiment, when the action plan unit 43 performs the switching operation a number of times less than or equal to a prescribed number until the vehicle S reaches the parking position in the driving process, the action plan unit 43 may execute the narrowness determination process constantly during that period.

Figure 4:
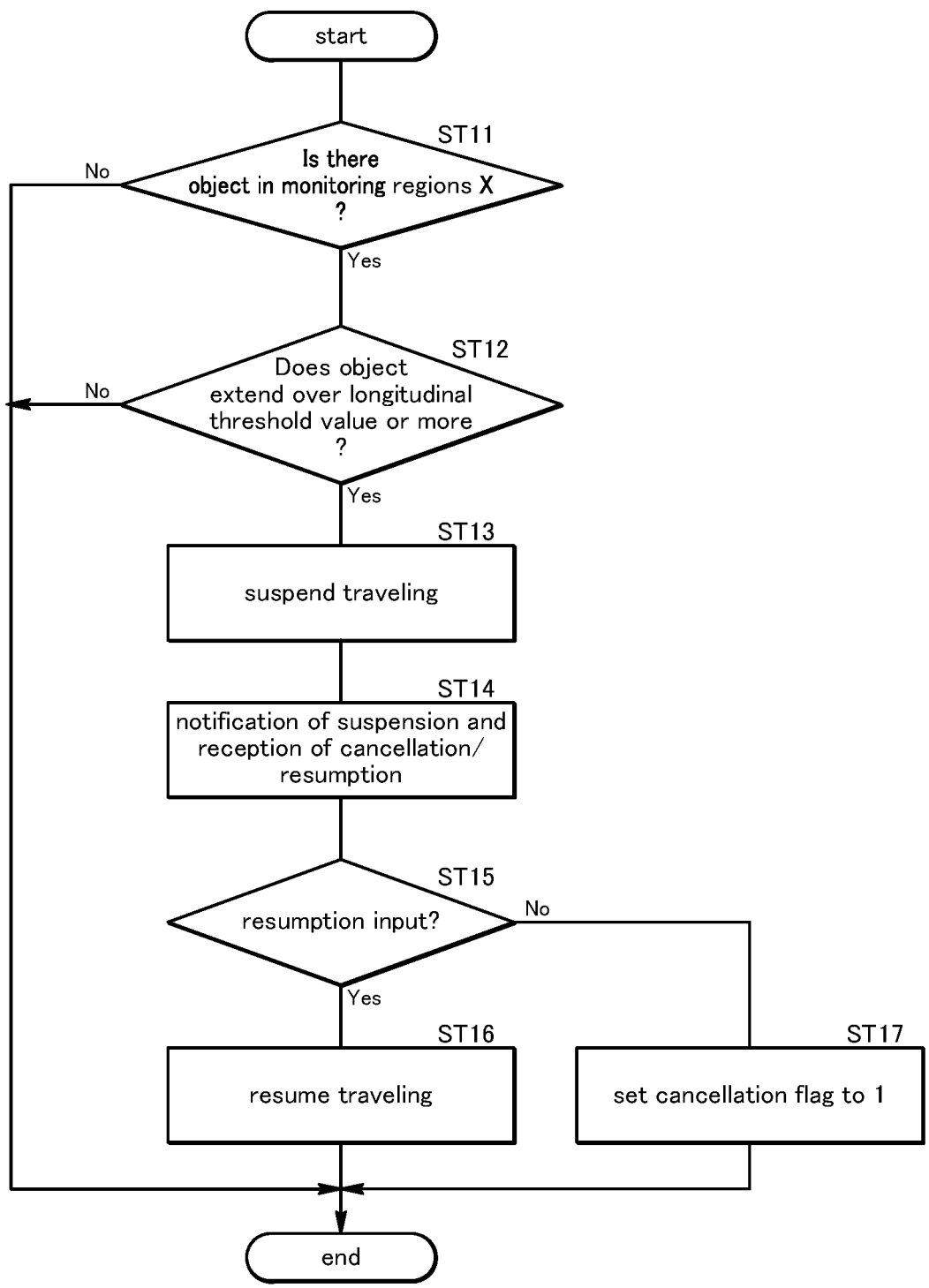
FIG. 4 is a flowchart of a narrowness determination process performed by the parking assist system according to the first embodiment.

FIG. 4 is a flowchart showing the narrowness determination process. As shown in FIG. 4, in the first step ST11 of the narrowness determination process, the action plan unit 43 acquires the positions of the objects recognized by the external environment recognizing unit 41 using the detection results of the sonars 18. Note that the objects recognized by the external environment recognizing unit 41 may include wall bodies, other vehicles, obstacles and the like, and are not limited to particular one of these.

Next, the action plan unit 43 determines whether any of the objects recognized by the external environment recognizing unit 41 is positioned within ranges defined on either lateral outside of the vehicle with respect to the travel direction of the vehicle S (see the shaded regions in FIGS. 5A and 5B), each range being less than or equal to a prescribed lateral threshold value W from the corresponding one of the left and right side surfaces of the vehicle S. In the following, each region within the range less than the prescribed lateral threshold value W from the door B positioned on the corresponding left or right side of the vehicle S on the vehicle outer side in the lateral direction (the left-right direction) with respect to the travel direction will be referred to as a monitoring region X.

The prescribed lateral threshold value W is set for each of the left and right sides of the vehicle S and corresponds to the minimum value of the gap (distance) between the vehicle S and an object outside the vehicle S usually required for the user (vehicle occupant) to open and close the door B to enter and exit the vehicle S. In other words, the prescribed lateral threshold value W corresponds to a threshold value less than which the gap between the vehicle S and the object positioned on the left or right of the vehicle S is insufficient so that the user usually cannot enter and exit the vehicle S by opening and closing the door B. The prescribed lateral threshold value W typically is about 40 cm.

Figure 5:
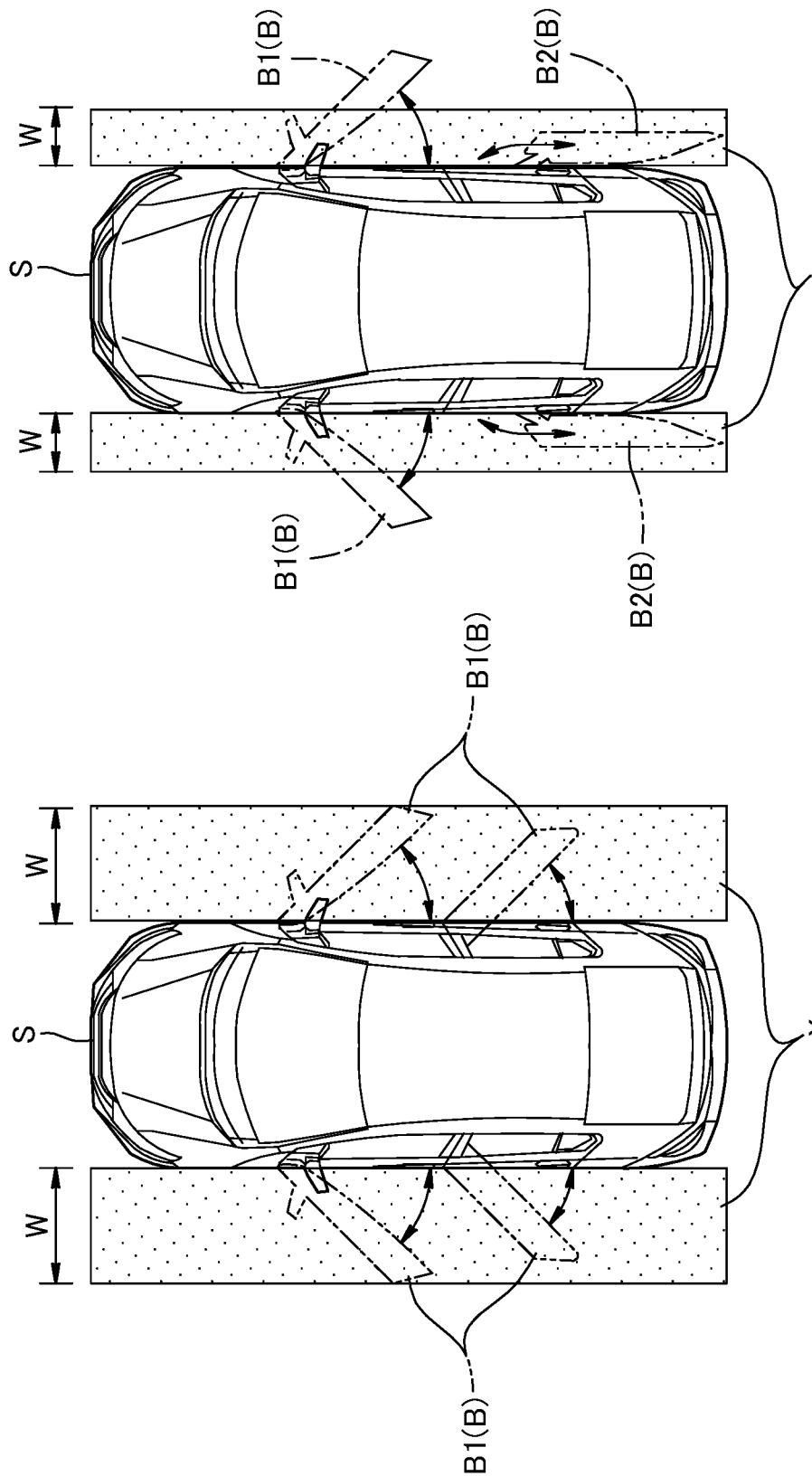
FIG. 5A is a diagram showing monitoring regions of a vehicle provided with hinged doors.
FIG. 5B is a diagram showing monitoring regions of a vehicle provided with slide doors.

The action plan unit 43 defines the prescribed lateral threshold value W depending on the movement mode of the doors B provided on the vehicle S. Specifically, as shown in FIGS. 5A and 5B, the action plan unit 43 sets the prescribed lateral threshold value W for the vehicle S provided with only the hinged doors B1 (see FIG. 5A) to be greater than the prescribed lateral threshold value W for the vehicle S having the slide doors B2 (see FIG. 5B).

Note that the present invention is not limited to the above, and the prescribed lateral threshold values W for the respective doors may be set based on input from the user via the touch panel 32 of the HMI 14 or the input/output unit 38 of the operation terminal 3 and stored in the control device 15, for example.

The action plan unit 43 determines whether any of the objects recognized by the external environment recognizing unit 41 is within the monitoring regions X and if yes, executes step ST12. If there is no object present within the monitoring regions X, the action plan unit 43 ends the narrowness determination process.

In step ST12, the action plan unit 43 determines whether any of the objects recognized by the external environment recognizing unit 41 extends over a prescribed longitudinal threshold value D or more in direction along the travel direction within the monitoring regions X.

The prescribed longitudinal threshold value D is defined to be greater than a typical length of a shutter or a gate provided in the garage or pillars provided at an entrance of the parking lot in a direction orthogonal to the parking direction.

Note that the present invention is not limited to the above and the prescribed longitudinal threshold values D may be set based on input from the user via the touch panel 32 of the HMI 14 or the input/output unit 38 of the operation terminal 3 and stored in the control device 15, for example.

When there is an object extending over the prescribed longitudinal threshold value D or more, the action plan unit 43 executes step ST13 and otherwise ends the narrowness determination process.

In step ST13, the action plan unit 43 makes the travel control unit 44 suspend the travel of the vehicle S. When the suspension of travel is completed, the action plan unit 43 executes step ST14. Note that the suspension of travel herein includes stopping of the vehicle S or deceleration of the vehicle S (for example, decreasing the vehicle speed from 10 km/h to 5 km/h).

Figure 6:
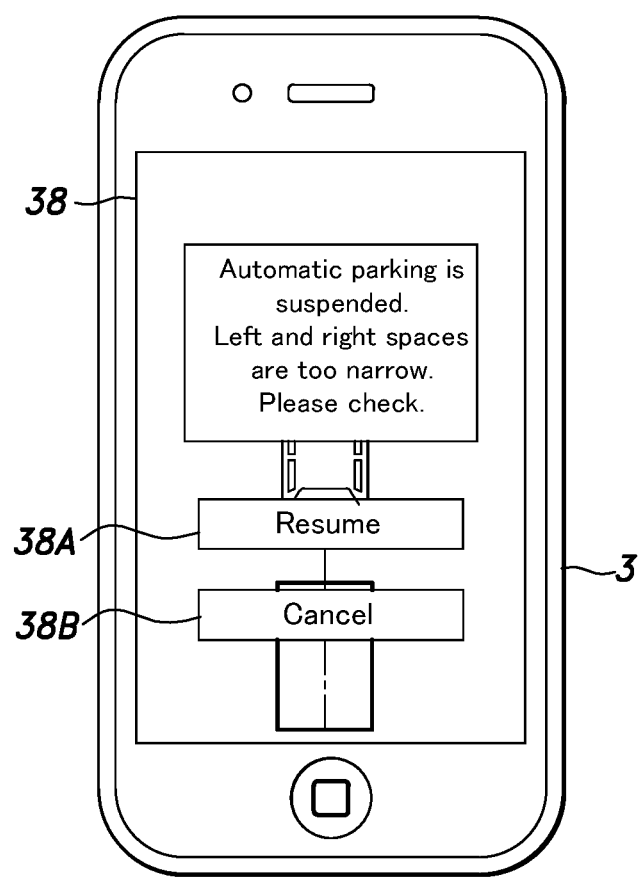
FIG. 6 is an example of a notification screen of the input/output unit of the operation terminal for notifying suspension of driving of the vehicle in the narrowness determination process.

In step ST14, the action plan unit 43 transmits a notification signal to the operation terminal 3. Upon receipt of the notification signal, the operation terminal 3 makes the input/output unit 38 (touch panel) of the operation terminal 3 display a notification that the automatic parking is suspended, a cancellation button 38A, and a resumption button 38B, as shown in FIG. 6, and stands by until the cancellation button 38A or the resumption button 38B is pressed. When the cancellation button 38A or the resumption button 38B is pressed, the operation terminal 3 transmits a reception signal indicating which button was pressed to the action plan unit 43. Upon receipt of the reception signal from the operation terminal 3, the action plan unit 43 executes step ST15.

In step ST15, the action plan unit 43 determines whether the pressed button is the resumption button 38B (namely, whether there was an input corresponding to the resumption request). When it is determined that the pressed button is the resumption button 38B, the action plan unit 43 executes step ST16. If it is determined that the pressed button is not the resumption button 38B, namely, the pressed button is the cancellation button 38A, the action plan unit 43 executes step ST17.

In step ST16, the action plan unit 43 makes the travel control unit 44 resume the travel of the vehicle S toward the parking position. When the travel is resumed, the action plan unit 43 ends the narrowness determination process.

In step ST17, the action plan unit 43 sets the cancellation flag to 1. When the setting of the cancellation flag is completed, the action plan unit 43 ends the narrowness determination process.

Also, in addition to setting the cancellation flag to 1 in step ST17, the action plan unit 43 cancels the driving process and executes the parking process. Thereby, the vehicle S is parked at the position where the driving process was suspended.

Next, the operation and effect of the parking assist system 1 configured as above will be described.

When the vehicle S is provided with the parking assist system 1 which can automatically park the vehicle S at the parking position and can autonomously move the vehicle S to a position where the user (occupant) can get in the vehicle S when in use, it is not necessary for the user to enter or exit the vehicle S parked in the parking position. Therefore, it is possible to park the vehicle S in a narrow space near which another vehicle, a wall body, or the like is located.

However, if, after the parking, an amount of charge of the battery becomes too small so that the vehicle S becomes unable to be started (a so-called out of battery state occurs), for example, it is necessary for the user to get in the vehicle S, to perform a prescribed operation to open the hood, and to connect a new battery. In such a case, if the gap between each door B and an object on the corresponding side is less than or equal to the prescribed lateral threshold value W after the parking as shown in FIG. 7A, for example, the door B cannot be opened, and the user cannot get in the vehicle S. Therefore, a problem arises that the user cannot get in the vehicle S to perform an operation to open the hood, and hence, the vehicle S becomes unable to be started.

To solve this problem, it may be conceived to prohibit the automatic parking to the parking position if, on the way to the parking position, the vehicle has to pass an object positioned such that the distance between the object and the opposing one of the left and right side surfaces of the vehicle body is less than or equal to the prescribed lateral threshold value W. However, if such an approach is adopted, a garage provided with a shutter as shown in FIG. 7B or a delimited parking space of a multistory parking lot which has a pillar at the entrance/exit thereof as shown in FIG. 7C cannot be set as a parking position, and thus the range of application in which the automatic parking can be executed will be limited.

Figure 7C:
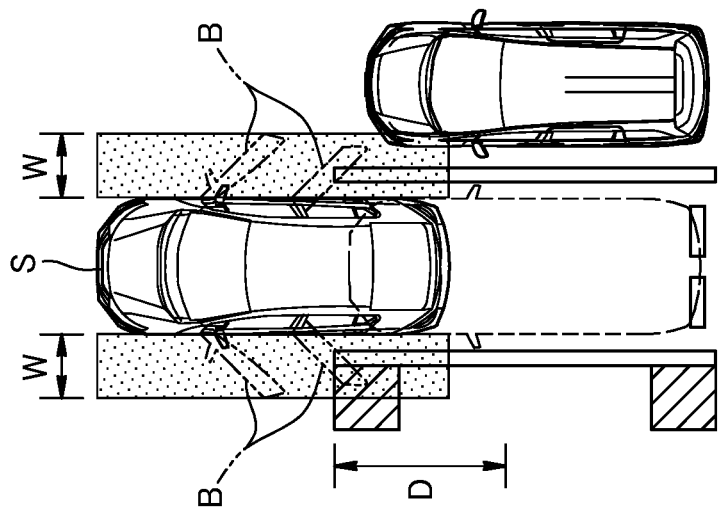
FIG. 7C is a schematic diagram showing the vehicle moving toward a parking position set in a parking space in a multistory parking lot provided with pillars.
Figure 7B:
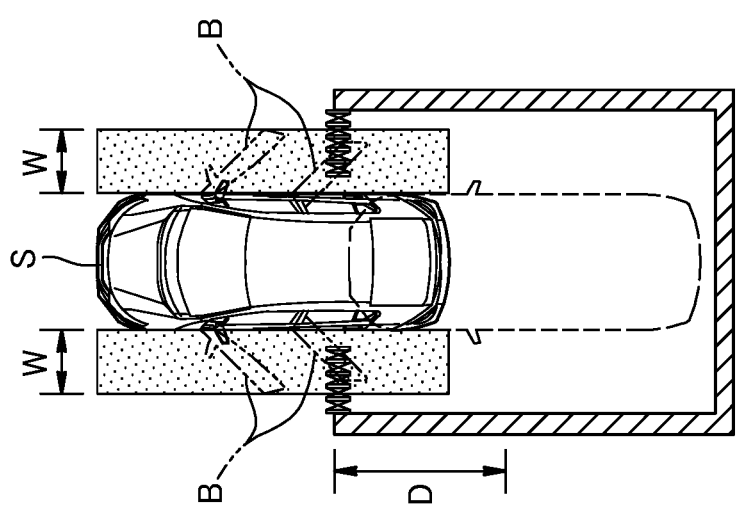
FIG. 7B is a schematic diagram showing the vehicle moving toward a parking position set in a parking space in a garage.
Figure 7A:
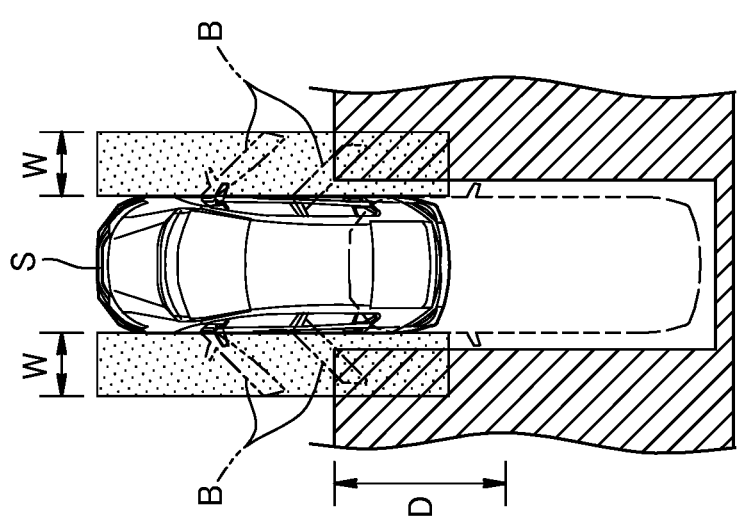
FIG. 7A is a schematic diagram showing the vehicle moving toward a parking position set in a parking space between wall bodies.

The inventors of the present application noted that with a garage or a parking space of a parking lot, it is often the case that only the vicinity of the entrance/exit thereof is narrowed as shown in FIGS. 7B and 7C. As a result of earnest study, the inventors of the present application concluded that the places where the vehicle S may be parked can be substantially classified into two groups; in one group, the width is constant from the entrance/exit to the parking position as shown in FIG. 7A, and in the other group, only the vicinity of the entrance/exit is narrowed as shown in FIGS. 7B and 7C. Further, the inventors of the present application have found that when the width in the direction orthogonal to the parking direction is constant over a prescribed distance (hereinafter, the prescribed longitudinal threshold value D) from the entrance/exit in the parking direction, this corresponds to the case where the width is constant from the entrance/exit to the parking position.

As shown in FIG. 7A, in the case where the width is constant from the entrance/exit to the parking position and the width of the gap between each of the left and right side surfaces of the vehicle S and the object (wall body) positioned on the corresponding left or right side is less than the prescribed lateral threshold value W, the doors B cannot be opened and it becomes difficult to get into the vehicle S.

In the case where the width is constant from the entrance/exit to the parking position and the width of the gap between each of the left and right side surfaces of the vehicle S and the object (wall body) positioned on the corresponding left or right side is less than the prescribed lateral threshold value W, the action plan unit 43 determines that there is an object within the monitoring regions X (Yes in ST11) and that the object extends over the prescribed longitudinal threshold value D or more in the fore and aft direction (Yes in ST12), and accordingly suspends the driving process (ST13).

At this time, from the suspension of the automatic parking (more specifically, the driving process), the user can recognize that the situation corresponds to the case where the width is constant from the entrance/exit to the parking position as shown in FIG. 7A and if the vehicle S is moved to the parking position, it may become difficult to enter and exit the vehicle S. Thereby, it is possible to prevent the vehicle S from being moved to and parked in a space where it is difficult to enter and exit the vehicle S (for example, between the two wall bodies shown in FIG. 7A) unexpectedly by the user.

In the present embodiment, while the vehicle S is moving from the last switching position toward the parking position, the action plan unit 43 continuously executes the narrowness determination process. As a result, when the vehicle S enters between two parallel wall bodies that are positioned such that the gap between each of the left and right side surfaces of the vehicle body and the opposing wall body is less than or equal to the prescribed lateral threshold value W, the driving process is suspended at a position reached when the vehicle S has moved from the end portion of the wall bodies toward the parking position by about the prescribed longitudinal threshold value D (namely, at a position where a part of the vehicle S extending over the prescribed longitudinal threshold value D from the end portion in the travel direction is located between the two wall bodies). Therefore, it is possible to prevent the vehicle S from completely entering between the two wall bodies, whereby it is easy to move the vehicle S out from between the two wall bodies.

After suspending the automatic parking, the action plan unit 43 makes the input/output unit 38 of the operation terminal 3 display the cancellation button 38A and the resumption button 38B (ST14). If the user presses the resumption button 38B (Yes in ST15), the action plan unit 43 makes the travel control unit 44 resume the travel of the vehicle S toward the parking position (ST16). Thus, the resumption button 38B corresponds to a reception button configured to receive input indicating that the resumption of the automatic parking process is desired.

In this way, when the automatic parking is suspended, the user can resume the automatic parking process by pressing the resumption button 38B. Therefore, in a case where the automatic parking is suspended by presence of an obstacle irrelevant to opening and closing of the doors B, the user can resume the automatic parking by pressing the resumption button 38B. Thus, compared to the case where the resumption button 38B is not displayed and the reception of resumption instruction cannot be performed, convenience of the parking assist system 1 is improved.

The action plan unit 43 sets the prescribed lateral threshold value W on the vehicle outer side of each hinged door B1 to be greater than the prescribed lateral threshold value W on the vehicle outer side of each slide door B2. In this way, since the prescribed lateral threshold value W is set according to the movement mode of each door B, the threshold values can be properly set such that the automatic parking is suspended when a space for opening and closing each door B in accordance with the movement mode of the door B cannot be secured on the lateral side of the vehicle S.

Also, when there is no object within the monitoring regions (No in ST11) or when there is an object within the monitoring regions X but the object does not exist over the prescribed longitudinal threshold value D or more in the fore and aft direction (No in ST12), the driving process is continued without being suspended.

As shown in FIGS. 7B and 7C, when there is an object within the monitoring regions X but the length of the object in the fore and aft direction is smaller than the prescribed longitudinal threshold value D and only the vicinity of the entrance/exit is narrowed (for example, the object is an accordion gate door) the driving process is continued without being suspended. Since the automatic parking is continued when only the entrance/exit is narrow and it can be expected that the doors B will be able to be opened and closed when the vehicle S is in the parking position, convenience of the parking assist system 1 is improved compared to the case where the automatic parking is suspended immediately when there is an object within the monitoring regions X.

Second Embodiment

Figure 8:
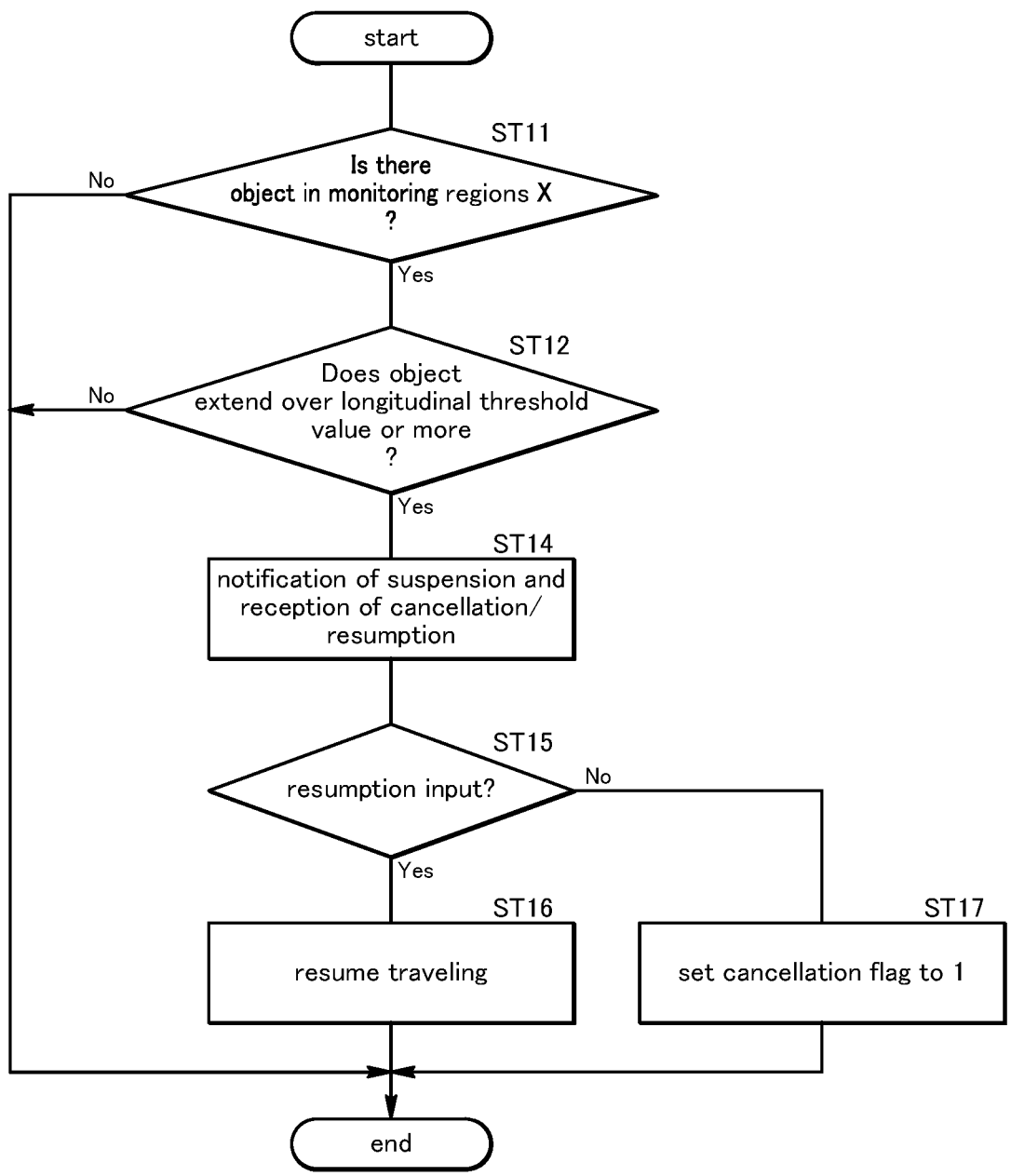
FIG. 8 is a flowchart of the narrowness determination process executed by a parking assist system according to the second embodiment of the present invention.

As shown in FIG. 8, a parking assist system 101 according to the second embodiment of the present invention differs from the first embodiment in that in the narrowness determination process executed by the action plan unit 43, step ST14 is executed immediately after step ST12 and the display on the input/output unit 38 of the operation terminal 3 in step ST14 differs, but the other configuration is the same as in the first embodiment. Therefore, description of the other configuration will be omitted.

When the action plan unit 43 determines in the narrowness determination process that there is an object within the monitoring regions X (Yes in ST11) and that the object exists over the prescribed longitudinal threshold value D or more within the monitoring regions X (Yes in ST12), the action plan unit 43 transmits a notification signal to the operation terminal 3 to make the input/output unit 38 of the operation terminal 3 display a notification that it may become impossible to enter and exit the vehicle S after the parking, as shown in FIG. 8 (ST14). At this time, the resumption button 38B and the cancellation button 38A are displayed together on the input/output unit 38 of the operation terminal 3.

When the input/output unit 38 detects pressing of the resumption button 38B (namely, input indicating that the resumption is desired) or pressing of the cancellation button 38A (namely, input indicating that the cancellation is desired), the operation terminal 3 transmits a reception signal to the control device 15. When the control device 15 receives a reception signal indicating that the receive resumption button 38B was pressed, the action plan unit 43 resumes the movement of the vehicle S (ST16). When the control device 15 receives a reception signal indicating that the cancellation button 38A was pressed, the action plan unit 43 sets the cancellation flag to 1 (ST17) and cancels the driving process to park the vehicle S.

Next, the effect of the parking assist system 101 configured as above will be described. In the case where the width is constant from the entrance/exit to the parking position and the width of the gap between each of the left and right side surfaces of the vehicle S and the object (wall body) positioned on the corresponding left or right side is less than the prescribed lateral threshold value W, the action plan unit 43 determines that there is an object within the monitoring regions X (Yes in ST11) and that the object extends over the prescribed longitudinal threshold value D or more in the fore and aft direction (Yes in ST12), and accordingly, a notification that it may become impossible to enter and exit the vehicle S after the parking is displayed on the input/output unit 38 of the operation terminal 3. Thereby, it is possible to prevent the vehicle S from being moved to and parked in a space where it is difficult to enter and exit the vehicle S (for example, between the two wall bodies shown in FIG. 7A) unexpectedly by the user.

When input indicating that it is desired to cancel the automatic parking, namely, pressing of the cancellation button 38A is detected by the input/output unit 38 of the operation terminal 3, the action plan unit 43 cancels the automatic parking. In this way, the user can easily cancel the automatic parking by making input to the input/output unit 38.

Third Embodiment

Figure 9:
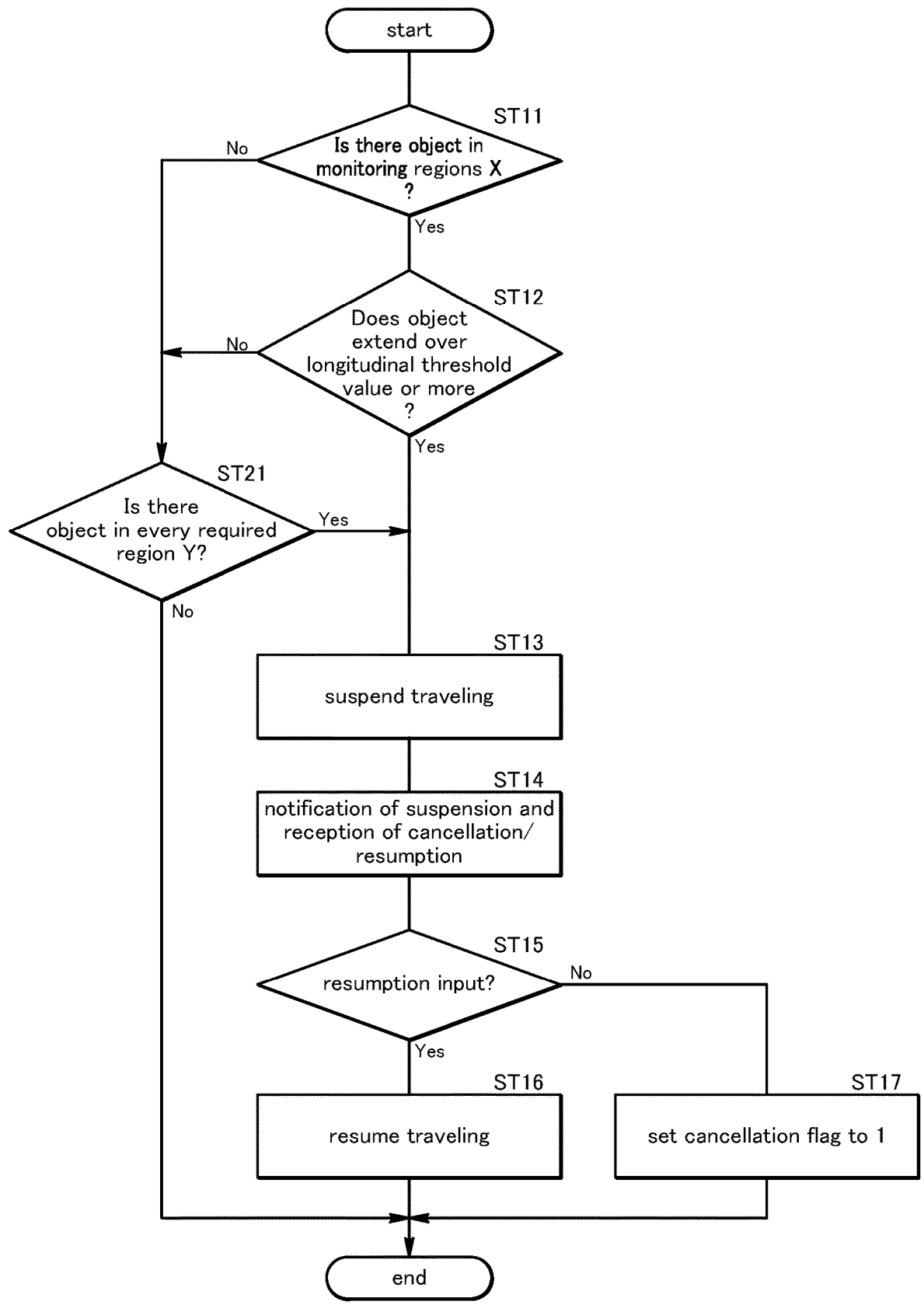
FIG. 9 is a flowchart of the narrowness determination process executed by a parking assist system according to the third embodiment of the present invention.
Figure 11:
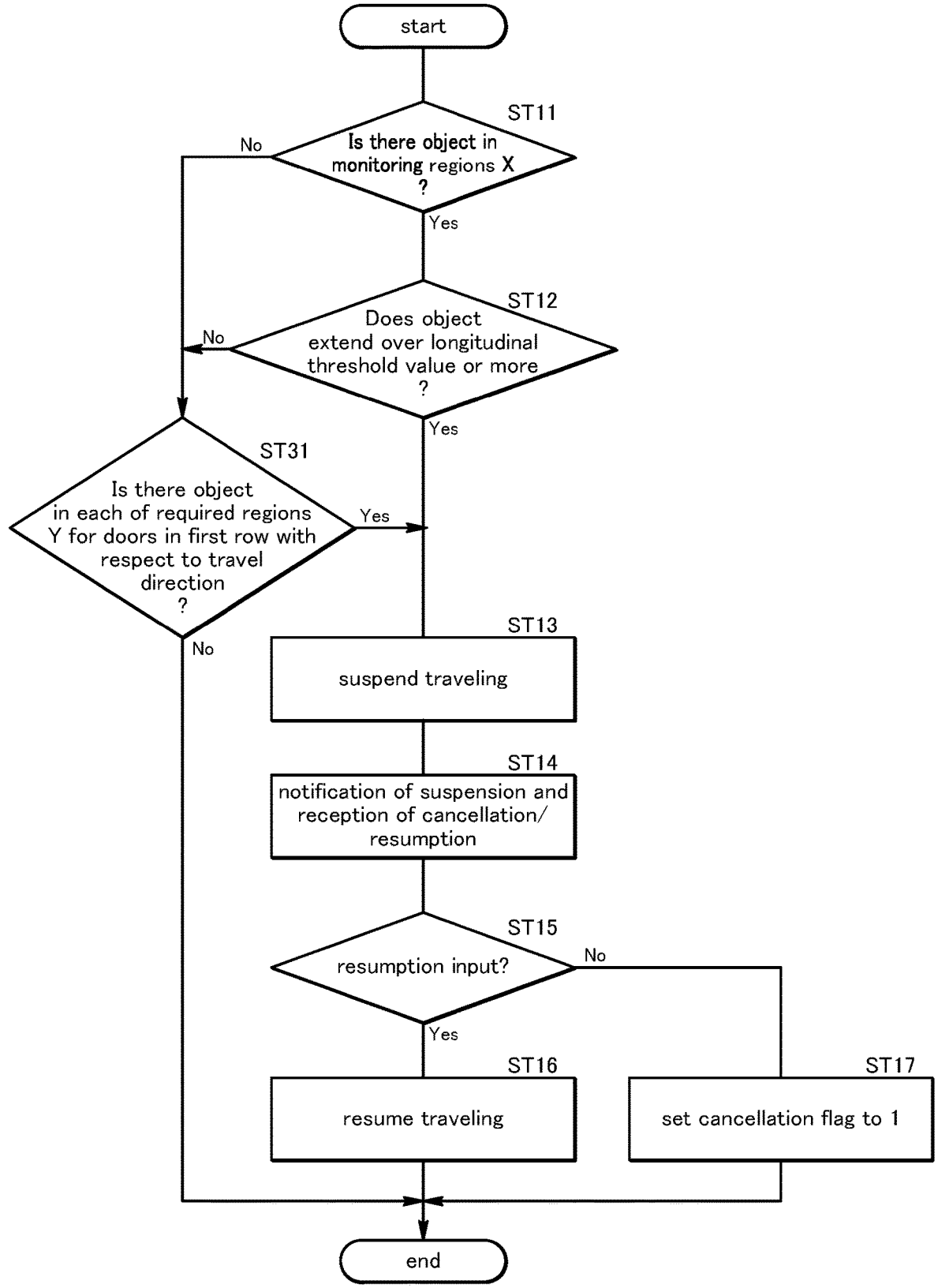
FIG. 11 is a flowchart of the narrowness determination process executed by a parking assist system according to the fourth embodiment of the present invention.

A parking assist system 201 according to the third embodiment of the present invention differs from the first embodiment in that the narrowness determination process includes step ST21, as shown in FIG. 9.

Further, as shown in FIGS. 10A and 10B, the storage unit 45 stores, as required regions Y, the regions that will be required for the user to move to the doors B of the vehicle S and open and close the doors B when the vehicle S is in the parking position. In the present embodiment, the storage device stores, for each door B and for each of forward parking and backward parking, a region that will be required for the user to open and close the door B and to enter and exit the vehicle S. The required region Y for each door B differs between forward parking (see FIG. 10A) and backward parking (see FIG. 10B).

The configuration other the above points is the same as in the first embodiment. Therefore, description of the other configuration will be omitted.

The action plan unit 43 executes step ST21 when the determination result of step ST11 is No or the determination result of ST12 is No. In step ST21, the action plan unit 43 acquires the required region Y for each door B from the storage unit 45 according to the parking mode (forward parking or backward parking). Thereafter, during the travel of the vehicle S, the action plan unit 43 determines whether there will be an obstruct in the required region Y of each door B so that the obstacle will hinder the opening and closing of the door B when the vehicle S has reached the parking position.

When it is determined that there will be an object in the required region Y of every door B, the action plan unit 43 executes step ST13, and otherwise the action plan unit 43 ends the narrowness determination process.

Next, the effect of the parking assist system 201 configured as above will be described. When the action plan unit 43 determines that there will be an object within the required region Y of every door B after the vehicle S has reached the parking position, the action plan unit 43 executes step ST13 to suspend the travel of the vehicle S (ST13). Thereafter, the action plan unit 43 makes the input/output unit 38 of the operation terminal 3 display a notification that the automatic parking has been suspended together with the cancellation button 38A and the resumption button 38B (ST14).

In this way, since the notification that the automatic parking has been suspended is displayed on the input/output unit 38, a situation where every door B cannot be opened and closed so that it is impossible to enter and exit the vehicle S when the vehicle S has reached the parking position can be prevented from occurring unexpectedly by the user.

Also, when it can be determined during the travel of the vehicle S that there will be no object in the required region Y of each door B that may hinder opening and closing of each door B when the vehicle S has reached the parking position, the action plan unit 43 continues the driving of the vehicle S to the parking position without making the input/output unit 38 of the operation terminal 3 make a notification. Therefore, convenience of the parking assist system 201 is improved.

Fourth Embodiment

A parking assist system 301 according to the fourth embodiment of the present invention differs from the third embodiment in that the narrowness determination process includes step ST31 instead of step ST21.

In step ST31, the action plan unit 43 determines whether there will be an object in each of the required regions Y of the left and right doors B in the first row with respect to the travel direction when the vehicle S has reached the parking position. When there is an object in each of the required regions Y of the left and right doors B in the first row with respect to the travel direction, the action plan unit 43 executes step ST13, and otherwise the action plan unit 43 ends the narrowness determination process.

Next, the operation of the parking assist system 301 configured as above will be described. In the parking assist system 301, when it is determined that there is an object in the monitoring regions X so as to extend over the prescribed longitudinal threshold value D or more (Yes in each of ST11 and ST12), the travel is suspended (ST13), but if the resumption input is made thereafter, the travel of the vehicle S is resumed. Thereafter, the narrowness determination process is executed again, and if there is an object in the required region Y of each of the left and right doors B in the first row with respect to the travel direction (Yes in ST31), the travel of the vehicle S is suspended. Thereafter, if the resumption input is made again (Yes in ST15), the travel of the vehicle S is resumed (ST16).

Concrete embodiments of the present invention have been described in the foregoing, but the present invention is not limited to the above embodiments and may be modified or altered in various ways. For example, in the above embodiments, the present invention was exemplarily applied to the parking assist system 1, 101, 201, 301 for parking the vehicle S, but the present invention is not limited to such embodiments. The present invention may be applied to a stop assist system for moving and stopping a movable object (moving body) which may include an automobile, a motorcycle, a unicycle, a watercraft, an aircraft, and the like.

Also, the signals used by the external environment recognizing unit 41 to recognize the objects around the vehicle S may be acquired by any of the sensors that may be included in the external environment sensor 7. Specifically, the external environment recognizing unit 41 may recognize the objects around the vehicle S based on the signals from any of the sonars 18, the external cameras 19, radars, lidars, and the like.

In the above embodiments, the notification that the automatic parking is suspended was made as a display on the input/output unit 38 of the operation terminal 3, but the notification method or means is not limited to this. For example, the notification may be made by a voice emitted from the operation terminal 3 or blinking of the screen or a light emitting element provided on the operation terminal 3.

In the above embodiments, the operation terminal 3 was a smartphone but the present invention is not limited to this. For example, the operation terminal 3 may be a tablet PC, a frequency operated button (FOB) key (also called a smart key or an entry key), or a remote controller. Also, in the above embodiments, the action plan unit 43 moved the vehicle S in the driving process based on the operation amount input to the operation terminal 3 but the device to which the operation amount is input is not limited to the operation terminal 3. The action plan unit 43 may move the vehicle S based on an input amount input to a switch, a lever, a sensor or the like provided in the vehicle S.

Also, in the above embodiments, the input/output unit 38 that makes a notification that the driving process has been suspended and receives an instruction to resume or not to resume the driving process was configured by the touch panel of the operation terminal 3, but the present invention is not limited to this. For example, the input/output unit 38 may be configured by the touch panel 32 of the HMI 14 provided in the vehicle S.

In the third embodiment described above, the action plan unit 43 was configured to execute step ST13 when it is determined in step ST21 that there is an object in every required region Y, but the present invention is not limited to this. For example, the action plan unit 43 may be configured to determine in step ST21 whether there is an object in each of the required regions Y for the left and right front doors B and to execute step ST13 when it is determined that there is an object in each of these two required regions Y. Besides, the action plan unit 43 may be configured to determine in step ST21 whether there is an object in the required region Y for the door B of the driver's seat and to execute step ST13 where it is determined that there is.

In the above embodiments, the prescribed longitudinal threshold value D was a fixed value according to the shape of the parking space or the like, but it may depend on the design of the vehicle S or the like. Also, the prescribed longitudinal threshold value D may depend on the parking direction (forward parking or backward parking). The prescribed lateral threshold value W may be changed depending on the number of doors B provided on the vehicle S in addition to depending on the movement mode of each door B. Particularly, the action plan unit 43 may set the prescribed lateral threshold value W for a two door vehicle S to be smaller than for a four door vehicle S.

Also, in step ST13 of the above embodiments, the action plan unit 43 may be configured to determine, based on the recognition result of the external environment recognizing unit 41, whether the object positioned within the monitoring regions X is a movable body such as a vehicle, to continue the travel of the vehicle S while decelerating it if the object is a movable body, and to stop the movement of the vehicle S if the object is not a movable body. Also, step ST13, the action plan unit 43 may be configured to determine, based on the recognition result of the external environment recognizing unit 41, whether the object positioned within the monitoring regions X is a movable body such as a vehicle, to make the input/output unit 38 display a warning and receive cancellation or resumption without decelerating the vehicle S if the object is a movable body, and to stop the movement if the vehicle S if the object is not a movable body.

Also, when the travel of the vehicle S is suspended (ST13) in the narrowness determination process of the above embodiments, the resumption input may be made thereafter (Yes in ST15) so that the travel is resumed (ST16) and the narrowness determination process is executed again. When executing the narrowness determination process in response to the resumption input, the action plan unit 43 may execute step ST21 (or step ST31) without executing steps ST11 and ST12.

In the above embodiments, the prescribed lateral threshold value W and the required regions Y were defined as threshold value and regions for defining ranges required for opening the doors B so that a person can enter and exit the vehicle S, but the present invention is not limited to this. For example, the prescribed lateral threshold value W and the required regions Y may be defined as a threshold value and regions for defining ranges required for opening the doors B to allow access to the interior of the cabin such that insertion of a hand in the cabin to operate an operation member provided in the cabin becomes possible.

The invention claimed is:

1. A stop assist system for moving a moving body to a stop position and making the moving body stop at the stop position, comprising:
    an external environment recognizing unit that recognizes an external environment of the moving body; and
    a moving body control unit that executes a driving process to make the moving body travel to the stop position based on a recognition result of the external environment recognizing unit,
    wherein the moving body control unit suspends the driving process when, while the moving body is traveling to the stop position, the moving body control unit determines, based on the recognition result, that there is an object within a range of a prescribed lateral threshold value on a lateral outside of the moving body and the object extends over a prescribed longitudinal threshold value or more along a travel direction within the range.

2. The stop assist system according to claim 1, further comprising an input/output unit capable of making a notification to a user of the moving body according to a signal from the moving body control unit and capable of receiving input from the user,
    wherein after suspending the driving process, the moving body control unit makes the input/output unit make a notification to the user inquiring whether to resume the driving process, and resumes the driving process when the input/output unit receives input from the user indicating that the user wants to resume the driving process.

3. A stop assist system for moving a moving body to a stop position and making the moving body stop at the stop position, comprising:
    an external environment recognizing unit that recognizes an external environment of the moving body;

a moving body control unit that executes a driving process to make the moving body travel to the stop position based on a recognition result of the external environment recognizing unit; and an input/output unit capable of making a notification to a user of the moving body according to a signal from the moving body control unit and capable of receiving input from the user, wherein while the moving body is traveling to the stop position, when the moving body control unit determines, based on the recognition result, that there is an object within a range of a prescribed lateral threshold value on a lateral outside of the moving body and the object extends over a prescribed longitudinal threshold value or more along a travel direction within the range, the moving body control unit makes the input/output unit make a notification notifying presence of the object.

4. The stop assist system according to claim 3, wherein after the input/output unit made the notification to the user, if the input/output unit receives input from the user instructing cancellation of the driving process, the moving body control unit cancels the driving process.

5. The stop assist system according to claim 1, wherein the moving body has an opening and closing member for entering and exiting the moving body, and the moving body control unit sets the prescribed lateral threshold value according to a movement mode of the opening and closing member.

6. The stop assist system according to claim 1, wherein the moving body control unit suspends the driving process when the moving body control unit determines that there will be an object within a required region that will be required for entering and exiting the moving body when the moving body is in the stop position.

7. The stop assist system according to claim 1, wherein the moving body control unit continues the driving process when, while the moving body is traveling, the moving body control unit determines based on the recognition result that no object extending over the prescribed longitudinal threshold value or more in the travel direction is present within the range of the prescribed lateral threshold value on the lateral out side of the moving body.

* * * * *